United States Patent
Arrasvuori

(10) Patent No.: US 9,218,682 B2
(45) Date of Patent: Dec. 22, 2015

(54) METHOD AND APPARATUS FOR GENERATING AN IMAGE

(75) Inventor: Juha Henrik Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 2052 days.

(21) Appl. No.: 12/251,967

(22) Filed: Oct. 15, 2008

(65) Prior Publication Data

US 2010/0091011 A1 Apr. 15, 2010

(51) Int. Cl.
| | | |
|---|---|---|
| *G06T 13/00* | (2011.01) | |
| *G06T 13/80* | (2011.01) | |
| *G06T 17/05* | (2011.01) | |
| *G06F 17/30* | (2006.01) | |

(52) U.S. Cl.
CPC .......... *G06T 13/00* (2013.01); *G06F 17/30241* (2013.01); *G06T 17/05* (2013.01)

(58) Field of Classification Search
CPC ......... G06T 13/00; G06T 13/80; G06T 17/05; G06F 17/30241; G01C 21/00; G01C 21/005; G01C 21/20; G01C 21/26; G01C 21/34; G01C 21/343; G01C 21/36–21/3697
USPC ....................................................... 345/418
See application file for complete search history.

(56) References Cited

U.S. PATENT DOCUMENTS

| | | | |
|---|---|---|---|
| 5,572,635 A | 11/1996 | Takizawa et al. | |
| 6,498,982 B2 * | 12/2002 | Bellesfield et al. | 701/202 |
| 6,940,997 B1 | 9/2005 | Kaneko | |
| 7,274,311 B1 * | 9/2007 | MacLeod | 340/995.13 |
| 7,818,336 B1 | 10/2010 | Amidon et al. | |
| 7,912,366 B2 * | 3/2011 | Huliyapur Math | 396/296 |
| 2002/0113757 A1 | 8/2002 | Hoisko | |
| 2004/0218894 A1 | 11/2004 | Harville et al. | |
| 2005/0131776 A1 * | 6/2005 | Perotti et al. | 705/27 |
| 2006/0001682 A1 * | 1/2006 | Honda | 345/646 |
| 2006/0069503 A1 | 3/2006 | Suomela et al. | |
| 2006/0174203 A1 | 8/2006 | Jung et al. | |
| 2007/0061735 A1 | 3/2007 | Hoffberg et al. | |
| 2007/0110338 A1 | 5/2007 | Snavely | |
| 2008/0262717 A1 * | 10/2008 | Ettinger | 701/206 |

(Continued)

FOREIGN PATENT DOCUMENTS

| | | |
|---|---|---|
| CN | 1497968 A | 5/2004 |
| CN | 101017506 A | 8/2007 |

(Continued)

OTHER PUBLICATIONS

World Wide Web, http://blogs.nokia.com/blogs/menzies/2008/01/navigation_goes.html, "Menzies Market Alert 3D Navigation Maps", printed Jan. 6, 2009, 2 pages.

(Continued)

*Primary Examiner* — Ke Xiao
*Assistant Examiner* — Jed-Justin Imperial
(74) *Attorney, Agent, or Firm* — Ditthavong & Steiner, P.C.

(57) ABSTRACT

In accordance with an example embodiment of the present invention, an apparatus, comprising a processor configured to determine a position information related to a first media object, determine a position information related to a second media object, and automatically generate at least one image based at least in part on the position information related to the first media object and based at least in part on the position information related to said second media object is disclosed.

22 Claims, 10 Drawing Sheets

(56) References Cited

U.S. PATENT DOCUMENTS

2009/0046111 A1* 2/2009 Joachim et al. ............... 345/660
2009/0289937 A1* 11/2009 Flake et al. .................... 345/419

FOREIGN PATENT DOCUMENTS

WO    WO 2005/089403 A2    9/2005
WO    WO 2005/089434 A2    9/2005

OTHER PUBLICATIONS

World Wide Web, http://labs.live.com/photosynth, "Photosynth", printed Jan. 6, 2009, 2 pages.

Torniai et al, "The Big Picture: Exploring Cities through Georeferenced Images and RDF Shared Metadata", http://www.andrew.cmu.edu/user/cdisalvo/chi2007workshop/papers/torniai_chi_2007_ws.pdf, 4 pages.

Final Rejection for related U.S. Appl. No. 11/952,452 dated Feb. 15, 2012, pp. 1-29.

177 Office Action for related U.S. Appl. No. 12/251,948 dated Mar. 16, 2012, pp. 1-34.

Office Action for related Chinese Patent Application No. 200980140923.4 dated Nov. 21, 2012, pp. 1-15.

* cited by examiner

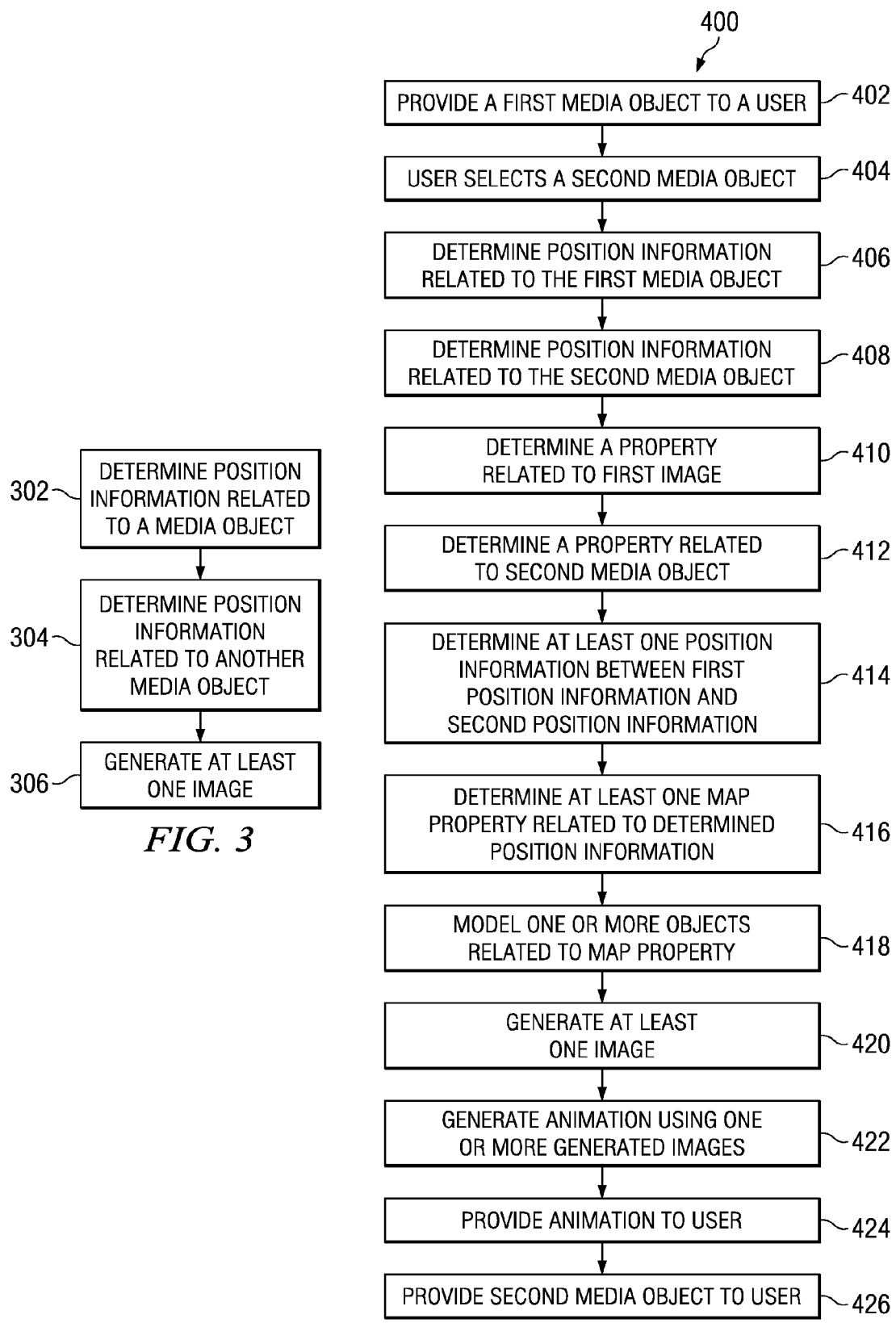

METHOD AND APPARATUS FOR GENERATING AN IMAGE

RELATED APPLICATIONS

This application relates to U.S. application Ser. No. 11/952,452, titled METHOD, APPARATUS AND COMPUTER PROGRAM PRODUCT FOR USING MEDIA CONTENT AS AWARENESS CUES, filed Dec. 7, 2007, which is hereby incorporated by reference in its entirety. This application also relates to U.S. application Ser. No. 11/961,467, titled METHOD, APPARATUS AND COMPUTER PROGRAM PRODUCT FOR UTILIZING REAL-WORLD AFFORDANCES OF OBJECTS IN AUDIO-VISUAL MEDIA DATA TO DETERMINE INTERACTIONS WITH THE ANNOTATIONS TO THE OBJECTS, filed Dec. 20, 2007, which is hereby incorporated by reference in its entirety. This application also relates to U.S. patent application, entitled "METHOD AND APPARATUS FOR PROVIDING A MEDIA OBJECT", which is being filed concurrently and is hereby incorporated by reference in its entirety.

TECHNICAL FIELD

The present application relates generally to generating an image.

BACKGROUND

There has been a recent surge in the usage of audio, video, images, and/or the like. With the increased availability of electronic devices and the increased availability of device connectivity, the user has unprecedented access to media information.

This plethora of media has changed the way people experience the world around them. When a user is planning to visit a place, he may now readily find media associated with that place. For example, a user of an electronic device may access a video of a park he is planning to see. In another example, a user may access images related to a building he is planning to visit.

SUMMARY

Various aspects of the invention are set out in the claims. In accordance with an example embodiment of the present invention, an apparatus, comprising a processor configured to determine a position information related to a first media object, determine a position information related to a second media object, and automatically generate at least one image based at least in part on the position information related to the first media object and based at least in part on the position information related to said second media object is disclosed.

In accordance with an example embodiment of the present invention, a method, comprising determining a position information related to a first media object, determining a position information related to a second media object, and automatically generating at least one image based at least in part on the position information related to the first media object and based at least in part on the position information related to said second media object is disclosed.

In accordance with an example embodiment of the present invention, a computer program product comprising a computer-readable medium bearing computer program code embodied therein for use with a computer, the computer program code comprising code for determining a position information related to a first media object, code for determining a position information related to a second media object, and code for automatically generating at least one image based at least in part on the position information related to the first media object and based at least in part on the position information related to said second media object is disclosed.

In accordance with an example embodiment of the present invention, computer-readable medium encoded with instructions that, when executed by a computer, perform determining a position information related to a first media object, determining a position information related to a second media object, and automatically generating at least one image based at least in part on the position information related to the first media object and based at least in part on the position information related to said second media object is disclosed.

BRIEF DESCRIPTION OF THE DRAWINGS

For a more complete understanding of example embodiments of the present invention, reference is now made to the following descriptions taken in connection with the accompanying drawings in which:

FIG. 3 is a flow diagram showing a method for automatically generating an image according to an example embodiment of the invention;

FIG. 4 is another flow diagram showing a method for automatically generating an image according to an example embodiment of the invention;

DETAILED DESCRIPTION OF THE DRAWINGS

An example embodiment of the present invention and its potential advantages are best understood by referring to FIGS. 1 through 12 of the drawings.

Figure 1:
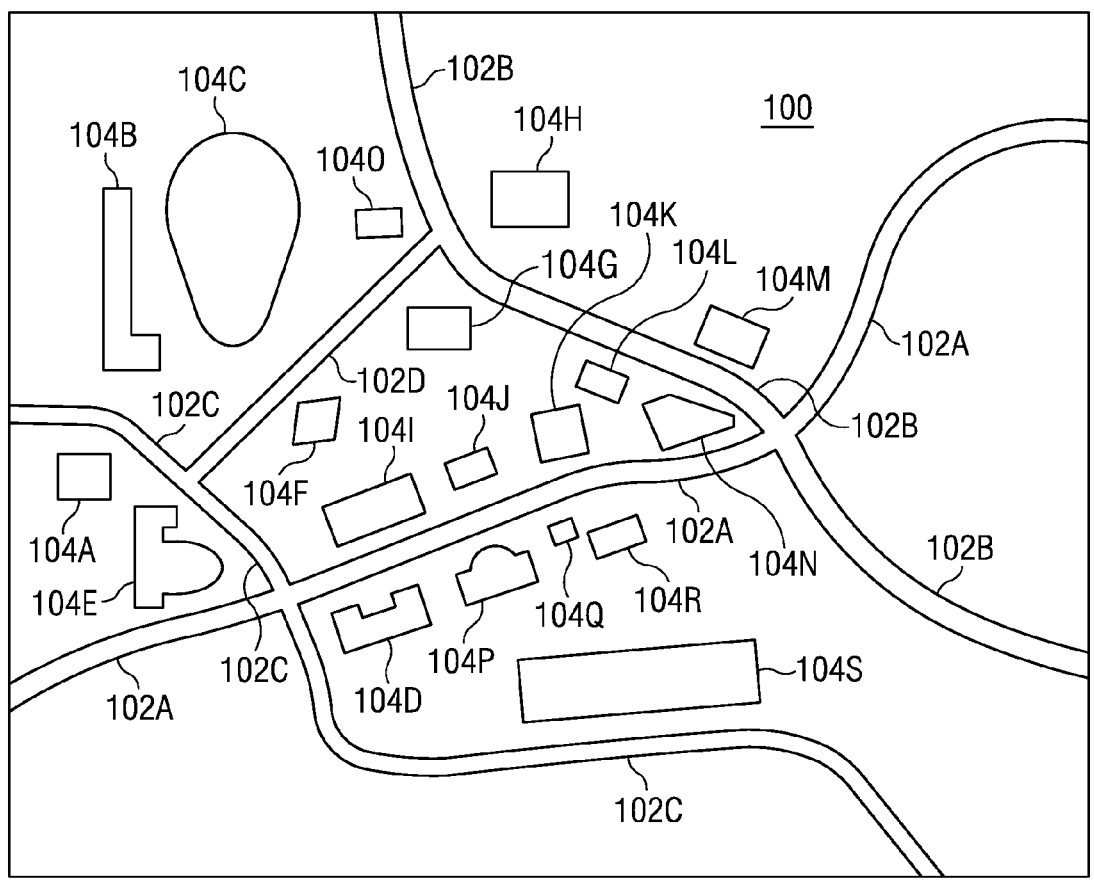
FIG. 1 is a diagram representing an example of map information which may be utilized by embodiments of the present invention.

FIG. 1 is a diagram representing an example of map information 100 which may be utilized by embodiments of the present invention. It should be understood, however, that the map information of FIG. 1 as illustrated and hereinafter described is merely illustrative of information which may be associated with a map, and therefore, should not be taken to limit the scope of the invention. It should be understood that there may be one or more methods for configuring, communicating, storing, and/or the like, map information and that such methods should not be taken to limit the scope of the present invention.

In an example embodiment, map information 100 may comprise street information, for example street information 102A-102D. In an example embodiment, street information may comprise information related to location, speed limit, direction, route, number of lanes, a traffic condition, road surface, construction, bicycle lane information, pedestrian accommodation information, and/or the like. For example, street information may comprise information indicating a bidirectional, 2 lane, asphalt paved, street between a first location and a second location. In an example embodiment street information may comprise information relating to an intersection of one or more streets. For example, street information may comprise information related to traffic control related to an intersection, such as a stop sign, traffic light, traffic circle, and/or the like.

In an example embodiment, map information 100 may comprise building information, for example building information 104A-104S. In an example embodiment, building information may comprise information related to location, shape, height, façade, and/or the like. For example, building information may comprise information indicating a rectangular building which is 12 m tall with a stone façade. It should be understood that building information may vary. For example, building information may indicate a building at a location. In another example, building information may indicate a building with a rectangular foundation at a location. In yet another example, building information may indicate a building at a location which is 15 m tall, with two rectangular foundations, where the space between the foundations comprises an opening through the building which is 7 m tall.

In an example embodiment, map information 100 may comprise further information which is not illustrated in FIG. 1. In an example embodiment, map information 100 may comprise topographical information. For example, map information 100 may comprise elevation information associated with one or more locations. In an example embodiment, map information may comprise zoning information. For example, map information 100 may comprise information indicating that an area relates to a single family residential area, a multi-family residential area, a retail area, an industrial area, and/or the like. In an example embodiment, map information 100 may comprise information related to a body of water. For example, map information may comprise information related to a river, a lake, a pond, an ocean, a bay, and/or the like. In an example embodiment, map information 100 may relate to flora information. For example, map information 100 may comprise information relating to a forest of oak trees in an area.

It may be desirable to associate position information with a media object. It should be understood that a media object may comprise image information, video information, audio information, and/or the like. For example, a media object may comprise one or more images. In an example embodiment, position information may comprise location information, heading information, elevation information, and/or the like. In an example embodiment, position information associated with a media object may relate to position information associated with the creation of the media object. For example, position information associated with a video may relate to the position of the device that captured the video. In an example embodiment, position information may relate to a position related to the content of a media object. For example, a video of a college football team winning a championship game may have associated position information corresponding with the location of the college, even though the video of the game may have been captured at a different college.

Figure 2:
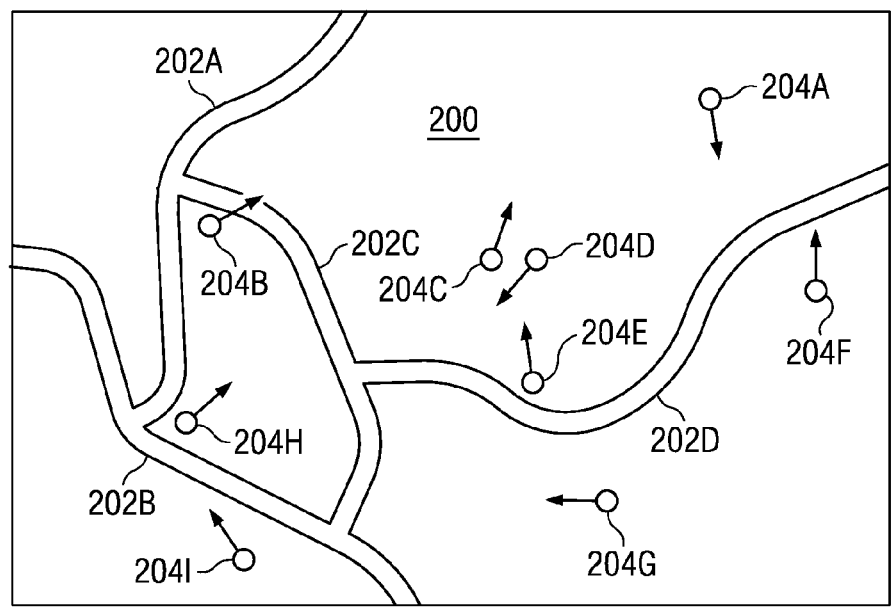
FIG. 2 is another diagram representing an example of map information which may be utilized by embodiments of the present invention.

FIG. 2 is another diagram representing an example of map information 200 which may be utilized by embodiments of the present invention. It should be understood, however, that the map information of FIG. 2 as illustrated and hereinafter described is merely illustrative of information which may be associated with a map, and therefore, should not be taken to limit the scope of the invention. It should be understood that there may be one or more methods for configuring, communicating, storing, and/or the like, map information and that such methods should not be taken to limit the scope of the invention.

In an example embodiment, map information 200 may comprise street information, for example street information 202A-202D. In an example embodiment, street information may comprise information related to location, speed limit, direction, route, number of lanes, a traffic condition, road surface, construction, bicycle lane information, pedestrian accommodation information, and/or the like. For example, street information may comprise information indicating a bidirectional, 2 lane, asphalt paved, street between a first location and a second location. In an example embodiment street information may comprise information relating to an intersection of one or more streets. For example, street information may comprise information related to traffic control related to an intersection, such as a stop sign, traffic light, traffic circle, and/or the like.

In an example embodiment, map information 200 may comprise information related to position information associated with a multimedia object. For example, position information 204A-204I. In the example of map information 200, heading information associated with position information may be represented in FIG. 2 by an arrow. In an example embodiment, one or more position information may relate to one or more media object. For example, position information 204D may relate to one media object. In another example, position information 204B may relate to two media objects. In yet another example, position information 204A and position information 204H may relate to similar media objects. In still another example, position information 204C and position information 204E may relate to the same media object.

In an example embodiment, it may be desirable to provide a visual transition between a media object related to a first position information and another media object related to a second position information. For example, it may be desirable to provide a user with a visual transition related to objects between the first position information and the second position information. In an example embodiment, it may be desirable to automatically generate such a visual transition. In an example embodiment, the visual transition may comprise one or more images. For example, the visual transition may comprise a single image which may be displayed for a period of time before the media object related to the second position information may be presented to the user. In such an example, the single image may be displayed to the user for 1 second before an image related to the second position information may be displayed. In another example, the visual transition may be more than one image which may be displayed for a period of time before the media object related to the second position information may be presented to the user. In such an example, the visual transition may comprise an animation comprising the generated images.

In an example embodiment, it may be desirable to automatically generate a visual transition by generating one or more images related to one or more objects associated with position information between the first position information and the second position information. For example, the visual transition may comprise an image comprising a building which may be located on a street which runs between the first position information and the second position information. In another example, the visual transition may comprise an animation depicting movement past objects along a path between the first position information and the second position information.

In an example embodiment, map information may be utilized to generate one or more images which may comprise a visual transition. For example, method 900 of FIG. 9 may be utilized to generate an image, such as image 1020 of FIG. 10B.

FIG. 3 is a flow diagram showing a method for automatically generating an image according to an example embodiment of the invention. It should be understood, however, that the method of FIG. 3 as illustrated and hereinafter described is merely illustrative of a method which may be associated with generating an image, and therefore, should not be taken to limit the scope of the invention.

At block 302, position information related to a media object is determined. Position information may be acquired from metadata associated with a media object, a database, and/or the like. Position information may be determined using one or more related media objects which may have associated position information. For example, a visual property of the media object may be compared to a visual property of another media object. In such an example, if common visual properties are found, position information associated with the media object may be calculated in relation to the position information of the other media object and a comparison of one or more visual properties.

At block 304, position information related to a second media object is determined. Position information may be acquired from metadata associated with a media object, a database, and/or the like. Position information may be determined using one or more related media objects which may have associated position information. For example, a visual property of the media object may be compared to a visual property of another media object. In such an example, if common visual properties are found, position information associated with the media object may be calculated in relation to the position information of the other media object and a comparison of one or more visual properties.

At block 306 at least one image is generated based at least in part on the first position information and based at least in part on the second position information. Method 900 of FIG. 9 may be utilized to generate the at least one image. The generated image may relate to a position information between the first position information and the second information. For example, the generated image may relate to a position information associated with a street between the first position information and the second position information. In another example, the generated image may relate to a position information associated with a field between the first position information and the second position information.

The position information associated with the generated image may be selected by determining a path between the first position information and the second position information. It should be understood that there may be more than one method for generating a path between the first position information and the second information. For example, a street routing method similar to a method utilized by a navigation system may be utilized. In another example, a direct routing method may be utilized.

FIG. 4 is another flow diagram showing a method for automatically generating an image according to an example embodiment of the invention. It should be understood, however, that the method of FIG. 4 as illustrated and hereinafter described is merely illustrative of a method which may be associated with generating an image, and therefore, should not be taken to limit the scope of the invention.

At block 402 a first media object is provided. Providing the media object may comprise displaying, rendering, playing, and/or the like. Providing may comprise sending the media object to a device. For example, providing may comprise sending a media object from a server, for example server 1108 of FIG. 11 to an access device, for example access device 1102 of FIG. 11. In such an example, providing may comprise utilizing a communication link, for example communication link 1110 of FIG. 11.

At block 404 a second media object is selected. There may be more than one method for a user to select the second media object and that the invention is not limited by the method for selecting the second media object. For example, a user may select a media object from a list of one or more media objects. In another example, a user may select a media object using a representation of one or more media objects mapped in relation to associated position information.

At block 406 position information related to the first media object is determined. At block 408 position information related to the second media object is determined. There may be more than one method to determine position information and that the invention is not limited by the method for determining position information related to a media object. For example, determination of position information may comprise evaluating metadata associated with the media object. In another example, determination of position information may comprise retrieving position information from a database associated with the media object.

At block 410 a property related the first media object is determined. At block 412 a property related to the second media object is determined. The property may relate to a stylistic property, a weather condition, a time period, and/or the like. A stylistic property may comprise a lighting condition, a color palette, a background sound, and/or the like. In an example embodiment, an image relating to subject matter during night time may have an associated property related to darkness. In another example embodiment, an image relating to subject matter which may be brightly lit has an associated property relating to brightness. In an example embodiment, color palette relates to one or more color properties associated with a media object. For example, a black and white video may have an associated property relating to a black and white color palette. In another example, a color image may have an associated property relating to a color palette. It should be understood that there may be more than one property and/or types of properties associated with a media object and that the invention is not limited by a property and/or type of property associated with a media object.

There may be one or more methods for determining a property associated with a media object. For example, a property may be determined by evaluating metadata associated with a media object. In another example, a property may be determined by evaluating the subject matter of the media object. In such an example, at least part of a media object may be evaluated for a color palette property.

At block 414 at least one position information between the first position information and the second position information is determined. In an example embodiment, position information associated with one or more intermediate positions between the first position and the second position is determined. In an example embodiment, the at least one determined position information relates to one or more locations between the first position information and the second position information. For example, the at least one determined position information may relate to locations along a path between the first position information and the second position information. In such an example, the path may relate to one or more streets, a topographical contour, a body of water, a direct line, and/or the like. In an example embodiment, heading information associated with the determined position information may relate to an intermediate heading between the first position information and the second position information. For example, if the heading associated with the first position information relates to a heading of north and the heading associated with the second position information relates to a heading of east, the at least one determined heading information may relate to at least one heading between north and east. In an example embodiment, determining position information between the first position information and the second position information, the position information may be determined using similar increments or increments of different size. For example, it may be desirable to distribute locations associated with determined position information evenly along a path between the first position information and the second position information. In another example, it may be desirable to have more position information associated with locations near the second position information than associated with locations near the first position information along a path. In such an example, there may be more determined position information related to an area surrounding the second position information than determined position information related to an area surrounding the first position information.

At block 416, at least one map property related to the determined position information is determined. For example, the map property may relate to building information, terrain information, elevation information, landscape information, zoning information, street information, sidewalk information, and/or the like.

At block 418, one or more objects related to the map property are modeled. In an example embodiment, a building is modeled relating to a map property associated with a building. In another example embodiment, plants are modeled relating to a map property associated with landscape information. In still another example embodiment, people are modeled relating to a map property associated with zoning information. For example, people representing a family on a walk may be modeled relating to a map property associated with a single-family residential zone. In another example, people representing shoppers may be modeled relating to a map property associated with a commercial retail zone. In an example embodiment, there may be one or more methods for modeling an object. For example, modeling method 900 of FIG. 9 may be utilized for modeling.

At block 420 at least one image is automatically generated using the model of block 418. For example, if a building, street, landscape, and people were modeled, an image relating to a view of the model may be generated. In such an example, the generated image may comprise an image representation of the building, the street, the landscape, and/or the people. In an example embodiment, the determined position information may be utilized when generating the image. In an example embodiment, determined heading information may be utilized when generating the image. For example, determined heading information may be utilized in determining the perspective of the image relating to the model. For example, if a model may be generated representing a one block area, the determined position information may be utilized to determine the perspective of an image generated from the one block model. In such an example, heading information relating to a north heading may be utilized so that the generated image conveys a perspective of the model relating to a viewer facing north.

At block 422 an animation is generated using the generated image or generated images of block 420. In an example embodiment, the animation may comprise displaying the at least one generated image. It should be understood that there may be more than one method for transitioning from one image to another. For example, there may be a panning transition, a fading transition, a zooming transition, and/or the like. Therefore, the scope of the invention is not limited by the method for transitioning. In an example embodiment, if more than one image is generated at block 420, the generated animation may comprise showing the generated images. In such an example, the time for which an image may be shown in the animation may differ. For example, a generated image may be shown for 1 second. In another example, an image may be shown for ½ second. In yet another example, one generated image may be shown for 1 second and another generated image may be shown for ½ second. In an example embodiment, a generated animation may comprise image 540 of FIG. 5C and image 560 of FIG. 5D.

At block 424, the generated animation may be provided to the user. Providing the generated animation may comprise displaying, rendering, playing, and/or the like. Providing may comprise sending the media object to a device. For example, providing may comprise sending the generated animation from a server, for example server 1108 of FIG. 11 to an access device, for example access device 1102 of FIG. 11. In such an example, providing may comprise utilizing a communication link, for example communication link 1110 of FIG. 11.

At block 426 the second media object may be provided to the user. Providing the media object may comprise displaying, rendering, playing, and/or the like. Providing may comprise sending the media object to a device. For example, providing may comprise sending a media object from a server, for example server 1108 of FIG. 11 to an access device, for example access device 1102 of FIG. 11. In such an example, providing may comprise utilizing a communication link, for example communication link 1110 of FIG. 11.

FIGS. 5A-5E are diagrams showing image generation according to an example embodiment of the invention. It should be understood, however, that the image generation of FIGS. 5A-5E as illustrated and hereinafter described are merely illustrative of visual information which may be associated with generating an image, and therefore, should not be taken to limit the scope of the invention.

In an example embodiment, it may be desirable to automatically generate two images associated with a first media object and a second media object. In an example embodiment method 300 of FIG. 3 may be utilized to generate the images.

Figure 5A:
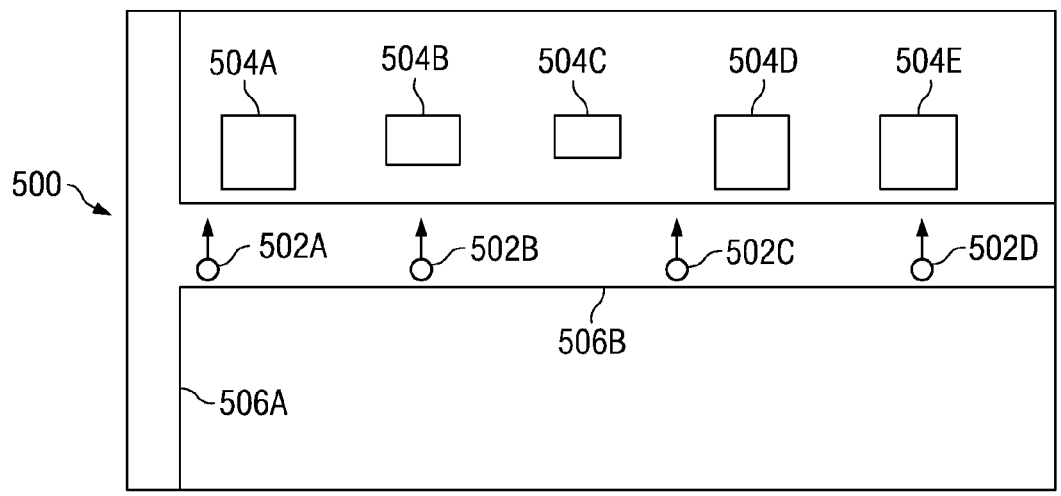
FIGS. 5A-5E are diagrams showing image generation according to an example embodiment of the invention.

FIG. 5A is a diagram representing an example of map information 500. It should be understood, however, that the map information of FIG. 5A as illustrated and hereinafter described is merely illustrative of information which may be associated with a map, and therefore, should not be taken to limit the scope of the invention. It should be understood that in some circumstances, the number of determined position information may vary. For example, it may be desirable to generate more images associated with a large transition between a position information and another position information. In such an example, it may be desirable to determine many position information between the position information and the other position information. In another example, it may be desirable to generate less images associated with a short transition between a position information and another position information. In such an example, it may be desirable to determine few position information between the position information and the other position information.

In an example embodiment, position information 502A may relate to position information associated with a first media object. In an example embodiment, position information 502D may relate to position information associated with a second media object. In an example, embodiment, position information 502B and position information 502C may relate to position information associated with generated images. For example, method 400 of FIG. 4 may determine position information 502B and position information 502C at block 414. In an example embodiment, generated position information 502B and 502C may relate to position information along a path between position information 502A and 502D.

In an example embodiment, building information 504A-504E may relate to building information of map information 500. In an example embodiment, building information 504A-504E may comprise information related to location, shape, height, façade, and/or the like. For example, building information 504B may comprise information related to a one story single family home having a rectangular base.

In an example embodiment, 506A and 506B may relate to street information. In an example embodiment, street information may comprise information related to location, speed limit, direction, route, number of lanes, a traffic condition, road surface, construction, bicycle lane information, pedestrian accommodation information, and/or the like. For example, street information 506B may relate to a two lane paved street.

Figure 5B:
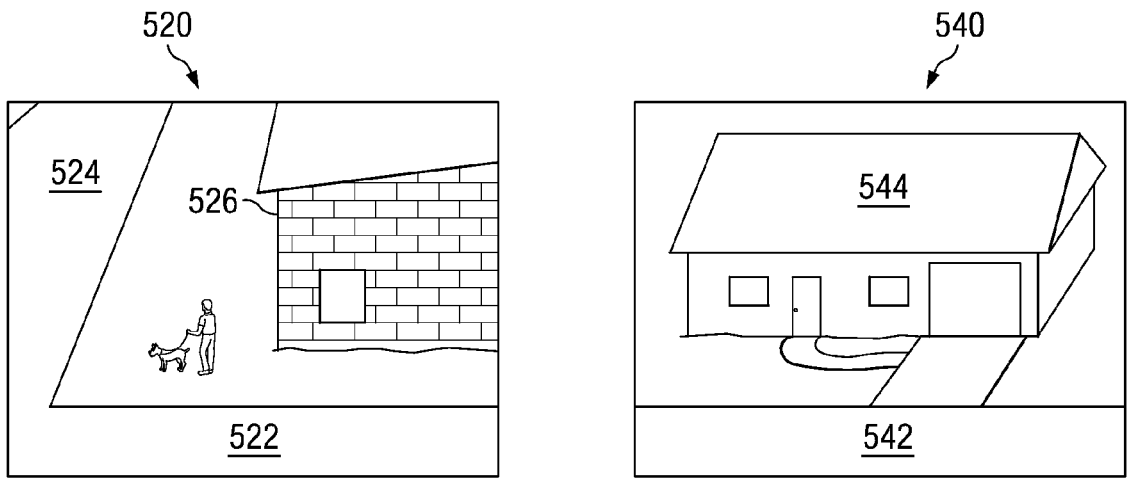

FIG. 5B is a diagram showing a visual representation 520 of a media object. It should be understood, however, that the visual representation of FIG. 5B as illustrated and hereinafter described is merely illustrative of visual information which may be associated with a media object, and therefore, should not be taken to limit the scope of the invention.

In an example embodiment, visual representation 520 may relate to an image having similar content, a frame of a video, and/or the like. In an example embodiment, visual representation 520 may associate with position information 502A of FIG. 5A. For example, position information 502A may relate to position information associated with the generation of the media object represented by visual representation 520. In an example embodiment, street representation 522 may relate to street information 506B of FIG. 5A. In an example embodiment street representation 524 may relate to street information 506A of FIG. 5A. In an example embodiment, building representation 526 may relate to building information 504A of FIG. 5A. It can be seen that a person and a dog are represented in visual representation 520. These represented elements may be a part of the media object represented by visual representation 520. For example, if visual representation 520 relates to a video, the person and dog in visual representation 520 may relate to a person and dog present in the video.

Figure 5C:
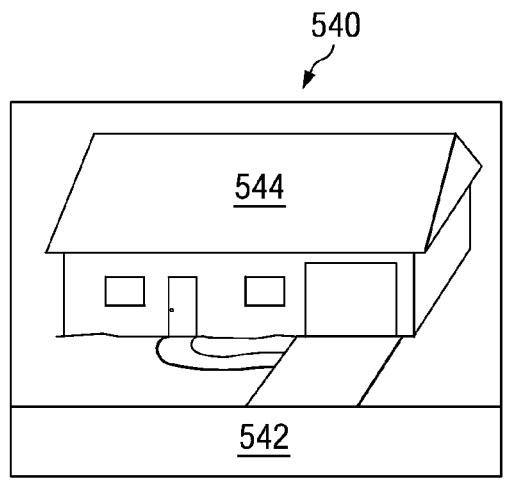

FIG. 5C is a diagram showing a visual representation 540 of a generated image, for example an image generated at block 306 of FIG. 3. It should be understood, however, that the visual representation of FIG. 5C as illustrated and hereinafter described is merely illustrative of visual information which may be associated with a generated image, and therefore, should not be taken to limit the scope of the invention.

In an example embodiment, visual representation 540 may associate with position information 502B of FIG. 5A. For example, position information 502B may have been determined at block 414 of FIG. 4. In an example embodiment, an element of visual representation may be related to a model, for example a model generated at block 904 of FIG. 9. In an example embodiment, street representation 542 may relate to street information 506B of FIG. 5A. In an example embodiment, building representation 544 may relate to building information 504B of FIG. 5A.

Figure 5D:
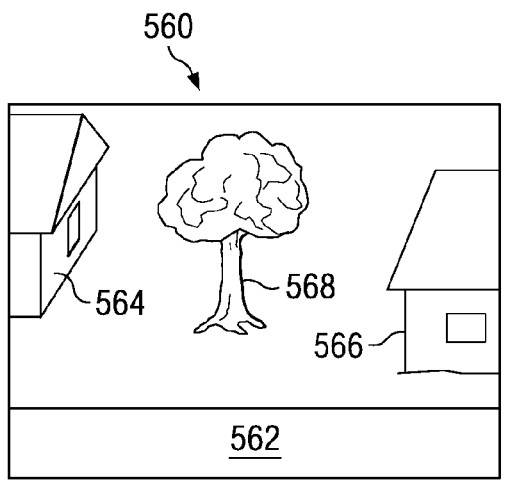

FIG. 5D is a diagram showing a visual representation 560 of a generated image, for example an image generated at block 306 of FIG. 3. It should be understood, however, that the visual representation of FIG. 5D as illustrated and hereinafter described is merely illustrative of visual information which may be associated with a generated image, and therefore, should not be taken to limit the scope of the invention.

In an example embodiment, visual representation 560 may associate with position information 502C of FIG. 5A. For example, position information 502C may have been determined at block 414 of FIG. 4. In an example embodiment, an element of visual representation may be related to a model, for example a model generated at block 904 of FIG. 9. In an example embodiment, street representation 562 may relate to street information 506B of FIG. 5A. In an example embodiment, building representation 564 may relate to building information 504C of FIG. 5A. In an example embodiment, building representation 566 may relate to building information 504D of FIG. 5A. In an example embodiment, tree representation 568 may be related to map information, for example foliage information, zoning information, and/or the like. In another example embodiment, tree representation 568 may relate to an elaborative element. For example, an elaborative element may be used to provide a more desirable image, to provide an element to indicate a stylistic transition, and/or the like.

Figure 5E:
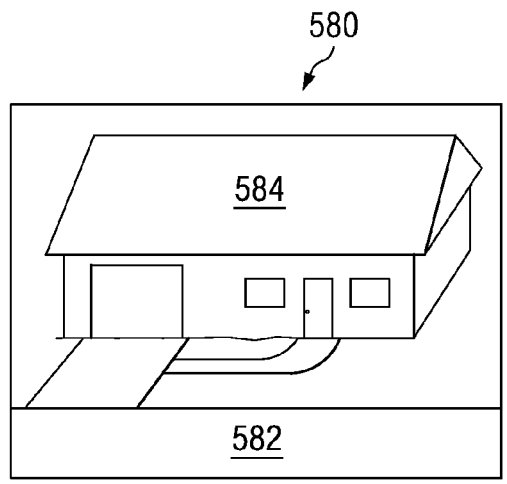

FIG. 5E is a diagram showing a visual representation 580 of a media object. It should be understood, however, that the visual representation of FIG. 5E as illustrated and hereinafter described is merely illustrative of visual information which may be associated with a media object, and therefore, should not be taken to limit the scope of the invention.

In an example embodiment, visual representation 580 may relate to an image having similar content, a frame of a video, and/or the like. In an example embodiment, visual representation 580 may associate with position information 502D of FIG. 5A. For example, position information 502D may relate to position information associated with the generation of the media object represented by visual representation 580. In an example embodiment, street representation 582 may relate to street information 506B of FIG. 5A. In an example embodiment, building representation 584 may relate to building information 504E of FIG. 5A.

FIGS. 6A-6F are additional diagrams showing image generation according to an example embodiment of the invention. It should be understood, however, that the image generation of FIGS. 6A-6F as illustrated and hereinafter described are merely illustrative of visual information which may be associated with generating an image, and therefore, should not be taken to limit the scope of the invention.

In an example embodiment, it may be desirable to utilize a media object associated with position information related to a first media object and a second media object. For example, when determining position information between the first media object and the second media object, it may be desirable to determine a position information associated with another media object. For example, position information associated with another media object may be near a path between the position information associated with the first media object and the position information associated with the second media object. In such an example, it may be desirable to utilize the other media object for at least part of a transition between the first media object and the second media object. It may also be desirable to automatically generate two images associated with a first media object and a second media object. In an example embodiment method 300 of FIG. 3 may be utilized to generate the images. It should be understood that in some circumstances, the number of determined position information may vary from this example. For example, it may be desirable to generate more images associated with a large transition between a position information and another position information. In such an example, it may be desirable to determine multiple position information. In another example, it may be desirable to generate less images associated with a short transition between a position information and another position information. In such an example, it may be desirable to determine few or one position information.

Figure 6A:
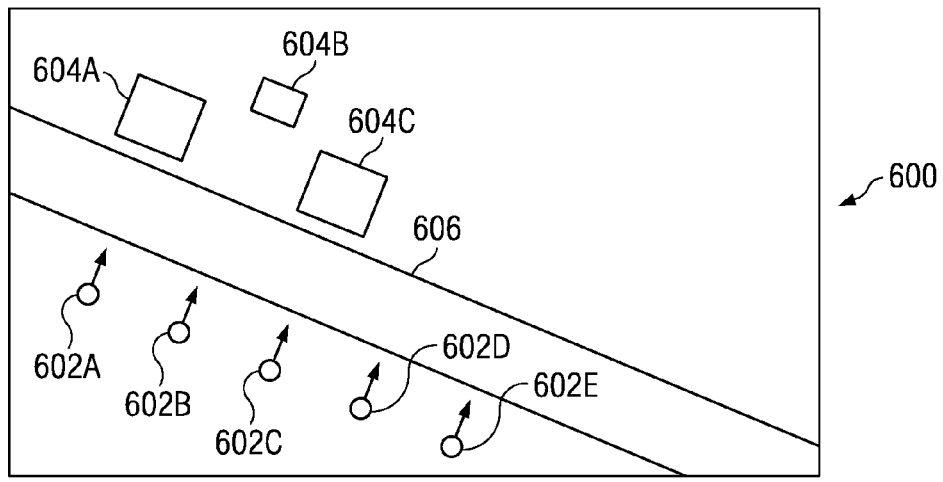
FIGS. 6A-6F are additional diagrams showing image generation according to an example embodiment of the invention.

FIG. 6A is a diagram representing an example of map information 600. It should be understood, however, that the map information of FIG. 6A as illustrated and hereinafter described is merely illustrative of information which may be associated with a map, and therefore, should not be taken to limit the scope of the invention.

In an example embodiment, position information 602A may relate to position information associated with a first media object. In an example embodiment, position information 602E may relate to position information associated with a second media object. In an example, embodiment, position information 602B and position information 602D may relate to position information associated with generated images. For example, method 400 of FIG. 4 may determine position information 602B and position information 602D at block 414. In an example embodiment, generated position information 602B and position information 602D may relate to position information along a path between position information 602A and position information 602E. In an example embodiment, position information 602C may relate to another media object. For example, the media object related to position information 602C may be present in a memory, a database, a server, and/or the like. It may be desirable to utilize an image associated with the media object instead of generating an image. In an example embodiment, building information 604A-604C may relate to building information of map information 600. In an example embodiment, building information 604A-604C may comprise information related to location, shape, height, façade, and/or the like. For example, building information 604B may comprise information related to a one story single family home having a rectangular base.

In an example embodiment, 606 may relate to street information. In an example embodiment, street information may comprise information related to location, speed limit, direction, route, number of lanes, a traffic condition, road surface, construction, bicycle lane information, pedestrian accommodation information, and/or the like. For example, street information 606 may relate to a four lane paved street.

Figure 6B:
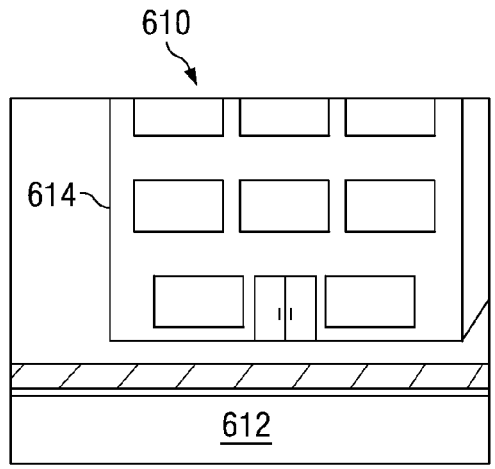

FIG. 6B is a diagram showing a visual representation 610 of a media object. It should be understood, however, that the visual representation of FIG. 6B as illustrated and hereinafter described is merely illustrative of visual information which may be associated with a media object, and therefore, should not be taken to limit the scope of the invention.

In an example embodiment, visual representation 610 may relate to an image having similar content to the media object, a frame of a video, and/or the like. In an example embodiment, visual representation 610 may associate with position information 602A of FIG. 6A. For example, position information 602A may relate to position information associated with the generation of the media object represented by visual representation 610. In an example embodiment, street representation 612 may relate to street information 606 of FIG. 6A. In an example embodiment, building representation 614 may relate to building information 604A of FIG. 6A.

Figure 6C:
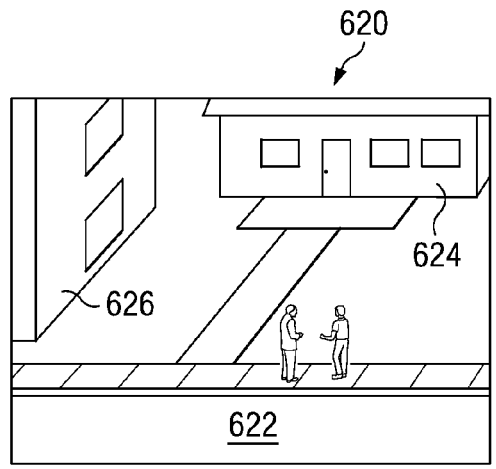

FIG. 6C is a diagram showing a visual representation 620 of a generated image, for example an image generated at block 306 of FIG. 3. It should be understood, however, that the visual representation of FIG. 6C as illustrated and hereinafter described is merely illustrative of visual information which may be associated with a generated image, and therefore, should not be taken to limit the scope of the invention.

In an example embodiment, visual representation 620 may associate with position information 602B of FIG. 6A. For example, position information 602B may have been determined at block 414 of FIG. 4. In an example embodiment, an element of visual representation may be related to a model, for example a model generated at block 904 of FIG. 9. In an example embodiment, street representation 622 may relate to street information 606 of FIG. 6A. In an example embodiment, building representation 626 may relate to building information 604A of FIG. 6A. In an example embodiment, building representation 624 may relate to building information 604B of FIG. 6A. It can be seen that elements representing two people are in visual representation 620. The represented elements may be related to map information, for example population information, zoning information, and/or the like. In another example embodiment, the people representations may relate to an elaborative element. For example, an elaborative element may be used to provide a more desirable image, to provide an element to indicate a stylistic transition, and/or the like.

Figure 6D:
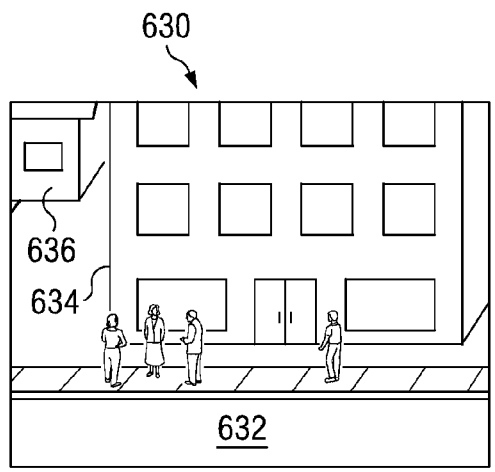

FIG. 6D is a diagram showing a visual representation 630 of a media object. It should be understood, however, that the visual representation of FIG. 6D as illustrated and hereinafter described is merely illustrative of visual information which may be associated with a media object, and therefore, should not be taken to limit the scope of the invention.

In an example embodiment, visual representation 630 may relate to an image having similar content, a frame of a video, and/or the like. In an example embodiment, visual representation 630 may associate with position information 602C of FIG. 6A. For example, position information 602C may relate to position information associated with the generation of the media object represented by visual representation 630. In an example embodiment, street representation 632 may relate to street information 606 of FIG. 6A. In an example embodiment, building representation 636 may relate to building information 604B of FIG. 6A. In an example embodiment, building representation 634 may relate to building information 604C of FIG. 6A. It can also be seen that representations of four people are shown in visual representation 630. These represented elements may be a part of the media object represented by visual representation 630. For example, if visual representation 630 relates to a video, building representation 634, building representation 636, street representation 632, and the representations of four people in visual representation 630 may relate to elements present in the video.

Figure 6E:
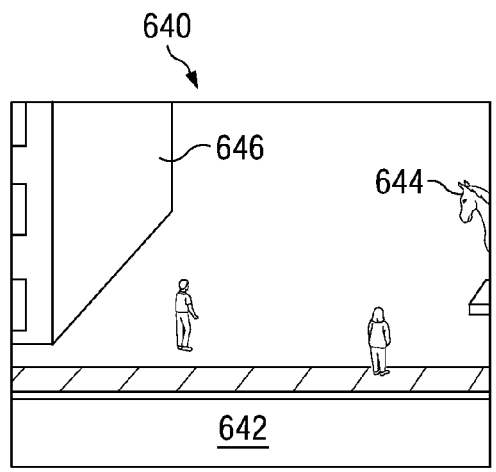

FIG. 6E is a diagram showing a visual representation 640 of a generated image, for example an image generated at block 306 of FIG. 3. It should be understood, however, that the visual representation of FIG. 6E as illustrated and hereinafter described is merely illustrative of visual information which may be associated with a generated image, and therefore, should not be taken to limit the scope of the invention.

In an example embodiment, visual representation 640 may associate with position information 602D of FIG. 6A. For example, position information 602D may have been determined at block 414 of FIG. 4. In an example embodiment, an element of visual representation may be related to a model, for example a model generated at block 904 of FIG. 9. In an example embodiment, street representation 642 may relate to street information 606 of FIG. 6A. In an example embodiment, building representation 646 may relate to building information 604C of FIG. 6A. In an example embodiment, statue representation 644 may be related to map information. For example map information may comprise information related to a statue. In another example embodiment, statue 644 may be related to information other than map information. For example, information related to the statue may be obtained from a database, a server, and/or the like. It can be seen that elements representing two people are in visual representation 640. The represented elements may be related to map information, for example population information, zoning information, and/or the like. In another example embodiment, the people representations may relate to an elaborative element. For example, an elaborative element may be used to provide a more desirable image, to provide an element to indicate a stylistic transition, and/or the like.

Figure 6F:
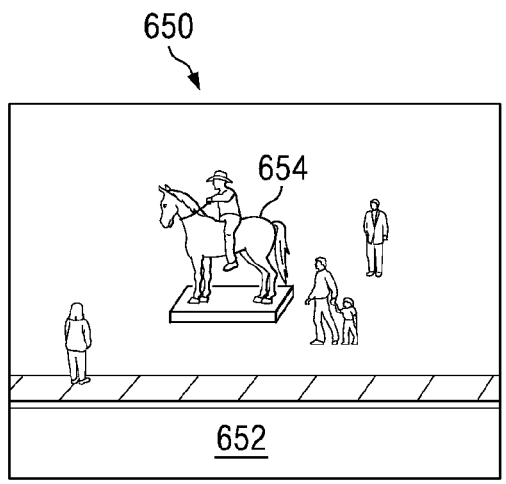

FIG. 6F is a diagram showing a visual representation 650 of a media object. It should be understood, however, that the visual representation of FIG. 6F as illustrated and hereinafter described is merely illustrative of visual information which may be associated with a media object, and therefore, should not be taken to limit the scope of the invention.

In an example embodiment, visual representation 650 may relate to an image having similar content, a frame of a video, and/or the like. In an example embodiment, visual representation 650 may associate with position information 602E of FIG. 6A. For example, position information 602E may relate to position information associated with the generation of the media object represented by visual representation 650. In an example embodiment, street representation 652 may relate to street information 606 of FIG. 6A. In an example embodiment, statue representation 654 may relate a statue associated with the media object. It can also be seen that representations of four people are shown in visual representation 650. These represented elements may be a part of the media object represented by visual representation 650. For example, if visual representation 650 relates to a video, statue representation 654, street representation 652, and the representations of four people in visual representation 650 may relate to elements present in the video.

FIGS. 7A-7F are further diagrams showing image generation according to an example embodiment of the present invention. It should be understood, however, that the image generation of FIGS. 7A-7F as illustrated and hereinafter described are merely illustrative of visual information which may be associated with generating an image, and therefore, should not be taken to limit the scope of the invention.

In an example embodiment, it may be desirable to transition heading information associated with position information related to an image. For example, if the heading information related to position information associated with a media object differs from the heading information related to position information associated with another media object, it may be desirable for the heading information of determined position information to reflect a transition between the heading information associated with the two media objects.

Figure 7A:
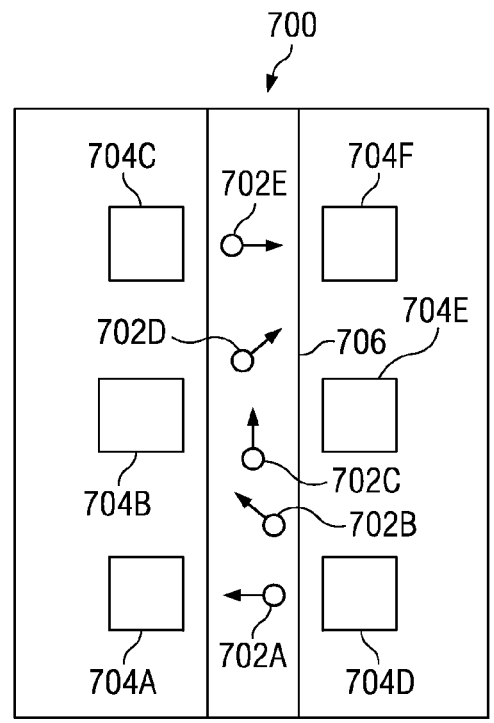
FIGS. 7A-7F are further diagrams showing image generation according to an example embodiment of the present invention.

FIG. 7A is a diagram representing an example of map information 700. It should be understood, however, that the map information of FIG. 7A as illustrated and hereinafter described is merely illustrative of information which may be associated with a map, and therefore, should not be taken to limit the scope of the invention.

In an example embodiment, position information 702A may relate to position information associated with a first media object. In an example embodiment, position information 702E may relate to position information associated with a second media object. In an example, embodiment, position information 702B, position information 702C, and position information 702D may relate to position information associated with generated images. For example, method 400 of FIG. 4 may determine position information 702B, position 702C, and position information 702D at block 414. In an example embodiment, generated position information 702B, position information 702C, and position information 702D may relate to position information along a path between position information 702A and position information 702E.

In an example embodiment, heading information may vary between determined position information. In an example embodiment, heading information associated with position information 702B may be between heading information associated with position information 702A and heading information associated with position information 702C. In an example embodiment, heading information associated with position information 702C may be between heading information associated with position information 702B and heading information associated with position information 702D. In an example embodiment, heading information associated with position information 702D may be between heading information associated with position information 702C and heading information associated with position information 702E. It should be understood that in some circumstances, it may be desirable for heading information related to transition images to relate a varying heading transition. For example, it may be desirable for the heading information to be toward a direction being traveled on a road, to be towards a landmark, and/or the like.

In an example embodiment, building information 704A-704F may relate to building information of map information 700. In an example embodiment, building information 704A-704F may comprise information related to location, shape, height, façade, and/or the like. For example, building information 704B may comprise information related to a one story single family home having a rectangular base.

In an example embodiment, street information 706 may comprise information related to location, speed limit, direction, route, number of lanes, a traffic condition, road surface, construction, bicycle lane information, pedestrian accommodation information, and/or the like. For example, street information 706 may relate to a two lane paved street.

Figure 7B:
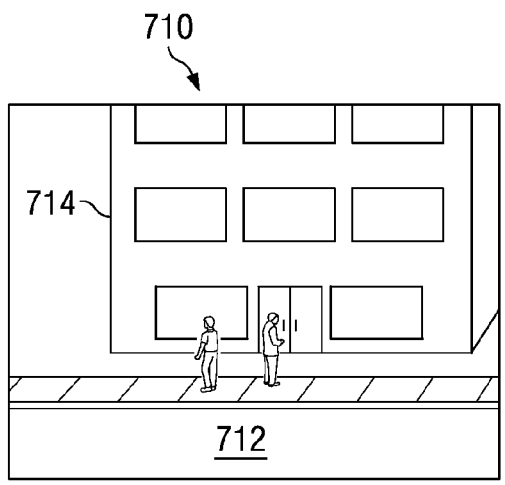

FIG. 7B is a diagram showing a visual representation 710 of a media object. It should be understood, however, that the visual representation of FIG. 7B as illustrated and hereinafter described is merely illustrative of visual information which may be associated with a media object, and therefore, should not be taken to limit the scope of the invention.

In an example embodiment, visual representation 710 may relate to an image having similar or identical content to the media object, a frame of a video, and/or the like. In an example embodiment, visual representation 710 may associate with position information 702A of FIG. 7A. For example, position information 702A may relate to position information associated with the generation of the media object represented by visual representation 710. In an example embodiment, street representation 712 may relate to street information 706 of FIG. 7A. In an example embodiment, building representation 714 may relate to building information 704A of FIG. 7A.

Figure 7C:
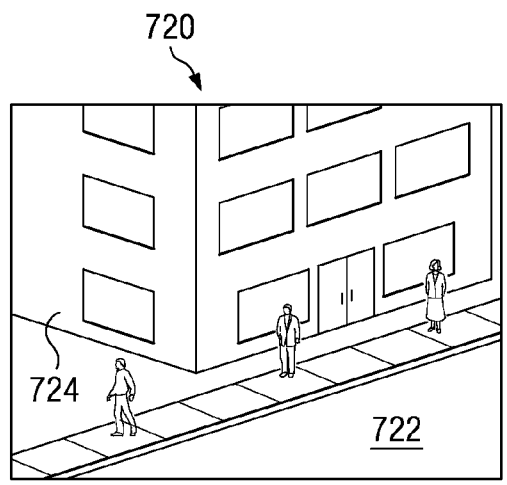

FIG. 7C is a diagram showing a visual representation 720 of a generated image, for example an image generated at block 306 of FIG. 3. It should be understood, however, that the visual representation of FIG. 7C as illustrated and hereinafter described is merely illustrative of visual information which may be associated with a generated image, and therefore, should not be taken to limit the scope of the invention.

In an example embodiment, visual representation 720 may associate with position information 702B of FIG. 7A. For example, position information 702B may have been determined at block 414 of FIG. 4. In an example embodiment, an element of visual representation may be related to a model, for example a model generated at block 904 of FIG. 9. In an example embodiment, street representation 722 may relate to street information 706 of FIG. 7A. In an example embodiment, building representation 724 may relate to building information 704B of FIG. 7A. It can be seen that elements representing three people are in visual representation 720. The represented elements may be related to map information, for example population information, zoning information, and/or the like. In another example embodiment, the people representations may relate to an elaborative element. For example, an elaborative element may be used to provide a more desirable image, to provide an element to indicate a stylistic transition, and/or the like.

Figure 7D:
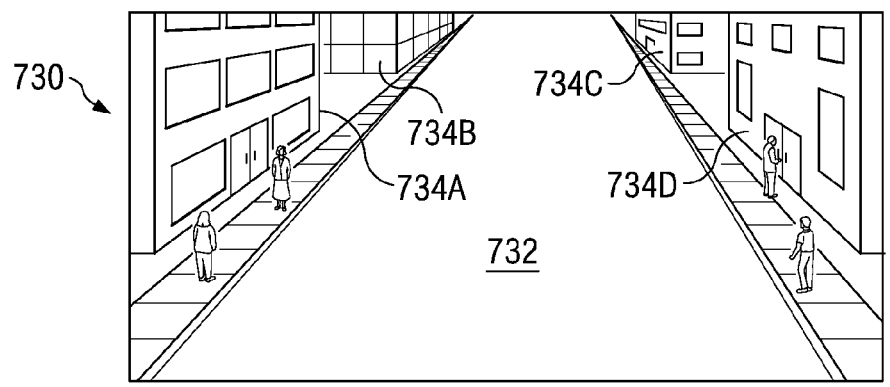

FIG. 7D is a diagram showing a visual representation 730 of a generated image, for example an image generated at block 306 of FIG. 3. It should be understood, however, that the visual representation of FIG. 7D as illustrated and hereinafter described is merely illustrative of visual information which may be associated with a generated image, and therefore, should not be taken to limit the scope of the invention.

In an example embodiment, visual representation 730 may associate with position information 702C of FIG. 7A. For example, position information 702C may have been determined at block 414 of FIG. 4. In an example embodiment, an element of visual representation may be related to a model, for example a model generated at block 904 of FIG. 9. In an example embodiment, street representation 732 may relate to street information 706 of FIG. 7A. In an example embodiment, building representation 734A may relate to building information 704B of FIG. 7A. In an example embodiment, building representation 734B may relate to building information 704C of FIG. 7A. In an example embodiment, building representation 734C may relate to building information 704F of FIG. 7A. In an example embodiment, building representation 734D may relate to building information 704E of FIG. 7A. It can be seen that elements representing four people are in visual representation 730. The represented elements may be related to map information, for example population information, zoning information, and/or the like. In another example embodiment, the people representations may relate to an elaborative element. For example, an elaborative element may be used to provide a more desirable image, to provide an element to indicate a stylistic transition, and/or the like.

Figure 7E:
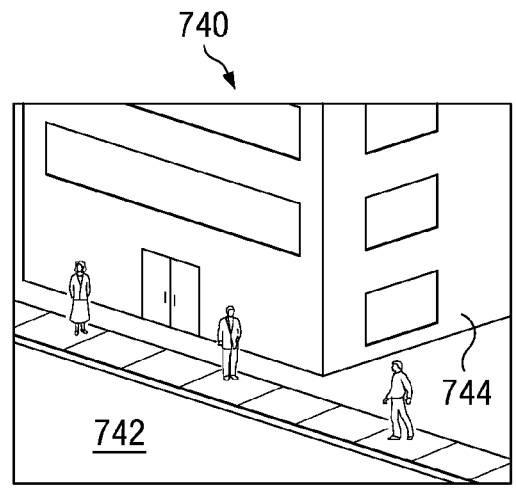

FIG. 7E is a diagram showing a visual representation 740 of a generated image, for example an image generated at block 306 of FIG. 3. It should be understood, however, that the visual representation of FIG. 7E as illustrated and hereinafter described is merely illustrative of visual information which may be associated with a generated image, and therefore, should not be taken to limit the scope of the invention.

In an example embodiment, visual representation 740 may associate with position information 702D of FIG. 7A. For example, position information 702D may have been determined at block 414 of FIG. 4. In an example embodiment, an element of visual representation may be related to a model, for example a model generated at block 904 of FIG. 9. In an example embodiment, street representation 742 may relate to street information 706 of FIG. 7A. In an example embodiment, building representation 744 may relate to building information 704F of FIG. 7A. It can be seen that elements representing three people are in visual representation 740. The represented elements may be related to map information, for example population information, zoning information, and/or the like. In another example embodiment, the people representations may relate to an elaborative element. For example, an elaborative element may be used to provide a more desirable image, to provide an element to indicate a stylistic transition, and/or the like.

Figure 7F:
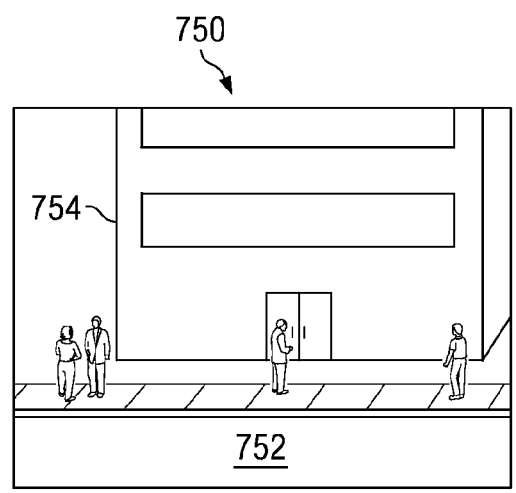

FIG. 7F is a diagram showing a visual representation 750 of a media object. It should be understood, however, that the visual representation of FIG. 7F as illustrated and hereinafter described is merely illustrative of visual information which may be associated with a media object, and therefore, should not be taken to limit the scope of the invention.

In an example embodiment, visual representation 750 may relate to an image having similar content, a frame of a video, and/or the like. In an example embodiment, visual representation 750 may associate with position information 702E of FIG. 7A. For example, position information 702E may relate to position information associated with the generation of the media object represented by visual representation 750. In an example embodiment, street representation 752 may relate to street information 706 of FIG. 7A. In an example embodiment, building representation 754 may relate to building information 704F of FIG. 7A. It can also be seen that representations of four people are shown in visual representation 750. These represented elements may be a part of the media object represented by visual representation 750. For example, if visual representation 750 relates to a video, statue representation 754, street representation 752, and the representations of four people in visual representation 750 may relate to elements present in the video.

FIGS. 8A-8F are further additional diagrams showing image generation according to an example embodiment of the present invention. It should be understood, however, that the image generation of FIGS. 8A-8F as illustrated and hereinafter described are merely illustrative of visual information which may be associated with generating an image, and therefore, should not be taken to limit the scope of the invention.

In an example embodiment, it may be desirable to reflect a stylistic transition between two or more media objects in a generated image. For example a generated image may reflect a transition between seasons, lighting conditions, and/or the like.

Figure 8A:
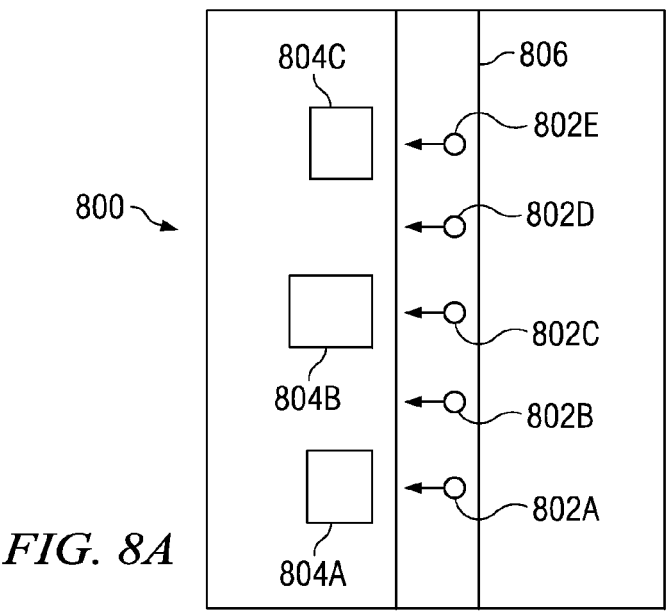
FIGS. 8A-8F are further additional diagrams showing image generation according to an example embodiment of the present invention.

FIG. 8A is a diagram representing an example of map information 800. It should be understood, however, that the map information of FIG. 8A as illustrated and hereinafter described is merely illustrative of information which may be associated with a map, and therefore, should not be taken to limit the scope of the invention.

In an example embodiment, position information 802A may relate to position information associated with a first media object. In an example embodiment, position information 802E may relate to position information associated with a second media object. In an example, embodiment, position information 802B, position information 802C, and position information 802D may relate to position information associated with generated images. For example, method 400 of FIG. 4 may determine position information 802B, position information 802C, and position information 802D at block 414. In an example embodiment, generated position information 802B, position information 802C, and position information 802D may relate to position information along a path between position information 802A and position information 802E.

In an example embodiment, a media object associated with position information 802A may relate to a season of summer. For example, a plant represented in the media object may indicate summer foliage. In an example embodiment, a media object associated with position information 802E may relate to a season of winter. For example, snow may be represented in the media object, a representation of a plant in the media object may indicate winter foliage, and/or the like. In an example embodiment, it may be desirable to indicate a transition from summer to winter in one or more generated images. Such an indication may improve a user's understanding of the context of the media object associated with position information 802E in relation to the media object associated with position information 802A.

In an example embodiment, building information 804A-804C may relate to building information of map information 800. In an example embodiment, building information 804A-804C may comprise information related to location, shape, height, façade, and/or the like. For example, building information 804B may comprise information related to a one story single family home having a rectangular base.

In an example embodiment, street information 806 may comprise information related to location, speed limit, direction, route, number of lanes, a traffic condition, road surface, construction, bicycle lane information, pedestrian accommodation information, and/or the like. For example, street information 806 may relate to a two lane paved street.

Figure 8B:
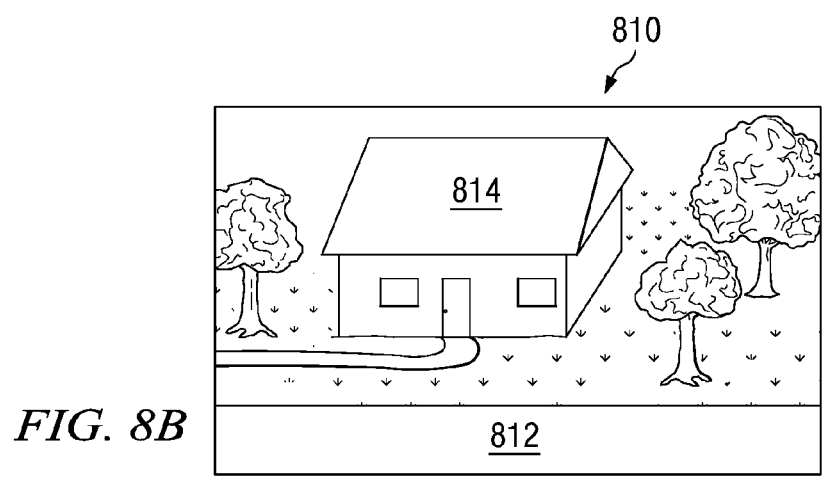

FIG. 8B is a diagram showing a visual representation 810 of a media object. It should be understood, however, that the visual representation of FIG. 8B as illustrated and hereinafter described is merely illustrative of visual information which may be associated with a media object, and therefore, should not be taken to limit the scope of the invention.

In an example embodiment, visual representation 810 may relate to an image having similar content to the media object, a frame of a video, and/or the like. In an example embodiment, visual representation 810 may associate with position information 802A of FIG. 8A. For example, position information 802A may relate to position information associated with the generation of the media object represented by visual representation 810. In an example embodiment, street representation 812 may relate to street information 806 of FIG. 8A. In an example embodiment, building representation 814 may relate to building information 804A of FIG. 8A. In an example embodiment, a media object associated with position information 802A may relate to a season of summer. For example, a plant represented in the media object may indicate summer foliage.

Figure 8C:
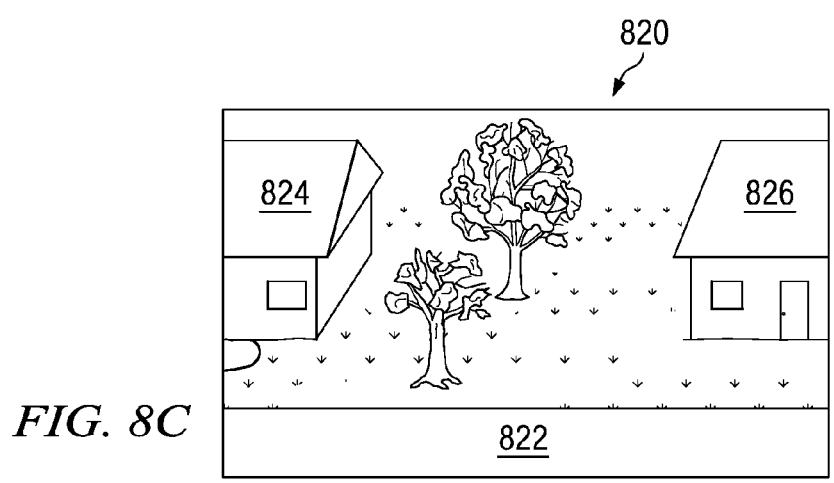

FIG. 8C is a diagram showing a visual representation 820 of a generated image, for example an image generated at block 306 of FIG. 3. It should be understood, however, that the visual representation of FIG. 8C as illustrated and hereinafter described is merely illustrative of visual information which may be associated with a generated image, and therefore, should not be taken to limit the scope of the invention.

In an example embodiment, visual representation 820 may associate with position information 802B of FIG. 8A. For example, position information 802B may have been determined at block 414 of FIG. 4. In an example embodiment, an element of visual representation may be related to a model, for example a model generated at block 904 of FIG. 9. In an example embodiment, street representation 822 may relate to street information 806 of FIG. 8A. In an example embodiment, building representation 824 may relate to building information 804A of FIG. 8A. In an example embodiment, building representation 826 may relate to building information 804B of FIG. 8A. In an example embodiment, representation 820 may indicate a seasonal transition from the season indicated in visual representation 810 of FIG. 8B. For example, visual representation may indicate a season of early autumn. An example of such an indication may be a foliage pattern associated with early autumn, such as foliage color, foliage pattern, and/or the like.

Figure 8D:
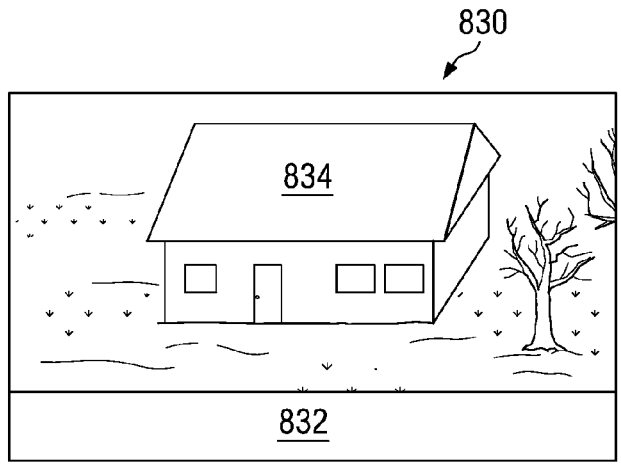

FIG. 8D is a diagram showing a visual representation 830 of a generated image, for example an image generated at block 306 of FIG. 3. It should be understood, however, that the visual representation of FIG. 8D as illustrated and hereinafter described is merely illustrative of visual information which may be associated with a generated image, and therefore, should not be taken to limit the scope of the invention.

In an example embodiment, visual representation 830 may associate with position information 802C of FIG. 8A. For example, position information 802C may have been determined at block 414 of FIG. 4. In an example embodiment, an element of visual representation may be related to a model, for example a model generated at block 904 of FIG. 9. In an example embodiment, street representation 832 may relate to street information 806 of FIG. 8A. In an example embodiment, building representation 834 may relate to building information 804B of FIG. 8A. In an example embodiment, representation 830 may indicate a seasonal transition from the season indicated in visual representation 820 of FIG. 8C. For example, visual representation may indicate a season of late autumn. An example of such an indication may be a foliage pattern associated with late autumn, such as foliage color, foliage pattern, and/or the like.

Figure 8E:
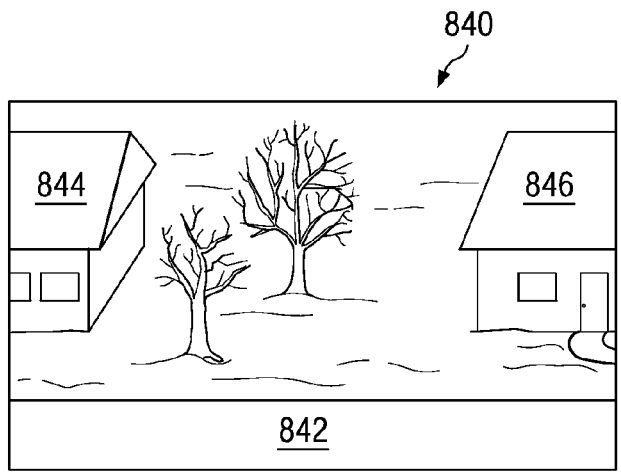

FIG. 8E is a diagram showing a visual representation 840 of a generated image, for example an image generated at block 306 of FIG. 3. It should be understood, however, that the visual representation of FIG. 8E as illustrated and hereinafter described is merely illustrative of visual information which may be associated with a generated image, and therefore, should not be taken to limit the scope of the invention.

In an example embodiment, visual representation 840 may associate with position information 802D of FIG. 8A. For example, position information 802D may have been determined at block 414 of FIG. 4. In an example embodiment, an element of visual representation may be related to a model, for example a model generated at block 904 of FIG. 9. In an example embodiment, street representation 842 may relate to street information 806 of FIG. 8A. In an example embodiment, building representation 844 may relate to building information 804B of FIG. 8A. In an example embodiment, building representation 846 may relate to building information 804C of FIG. 8A. In an example embodiment, representation 840 may indicate a seasonal transition from the season indicated in visual representation 830 of FIG. 8D. For example, visual representation may indicate a season of early winter. An example of such an indication may be a foliage pattern associated with early winter, such as foliage color, foliage pattern, and/or the like. In an example embodiment, presence of snow, amount of snow, and/or the like may indicate a season of early winter.

Figure 8F:
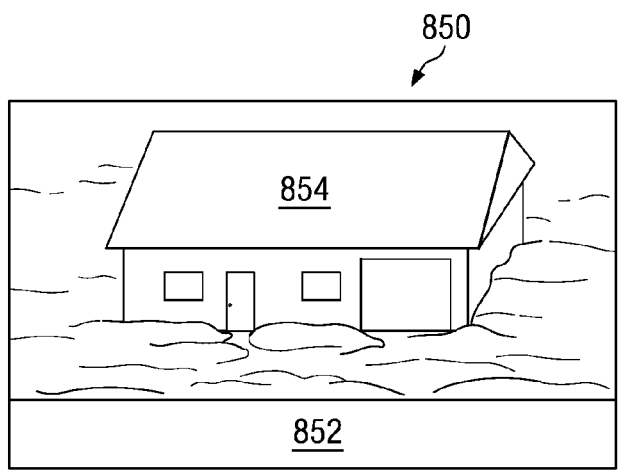

FIG. 8F is a diagram showing a visual representation 850 of a media object. It should be understood, however, that the visual representation of FIG. 8F as illustrated and hereinafter described is merely illustrative of visual information which may be associated with a media object, and therefore, should not be taken to limit the scope of the invention.

In an example embodiment, visual representation 850 may relate to an image having similar content, a frame of a video, and/or the like. In an example embodiment, visual representation 850 may associate with position information 802E of FIG. 8A. For example, position information 802E may relate to position information associated with the generation of the media object represented by visual representation 850. In an example embodiment, street representation 852 may relate to street information 806 of FIG. 8A. In an example embodiment, building representation 854 may relate to building information 804C of FIG. 8A. In an example embodiment, visual representation 850 may relate to a season of winter. For example, snow may be represented, a representation of a plant winter foliage, and/or the like.

Figure 9:
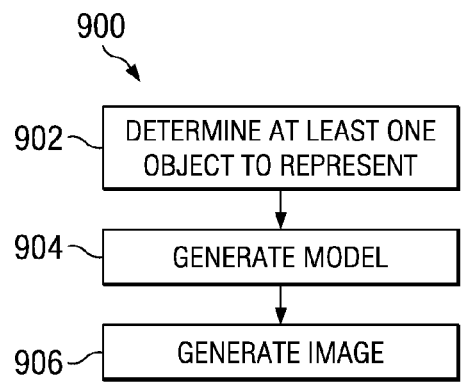
FIG. 9 is yet another flow diagram showing a method for automatically generating an image according to an example embodiment of the invention.

FIG. 9 is yet another flow diagram showing a method for automatically generating an image according to an example embodiment of the invention. It should be understood, however, that the method of FIG. 3 as illustrated and hereinafter described is merely illustrative of a method which may be associated with generating an image, and therefore, should not be taken to limit the scope of the invention.

At block 902 at least one object to be represented is determined. Object determination may comprise utilization of map information, such as building information, terrain information, elevation information, landscape information, zoning information, street information, sidewalk information, and/or the like. For example, object determination may comprise utilization of building information 104E of FIG. 1, street information 102A of FIG. 1, and street information 102C of FIG. 1.

At block 904 a model is generated. Generating may comprise generating a model of a building, a street, a plant, a person, terrain, a sidewalk, a hill, and/or the like. A building may be modeled relating to building information. Plants may be modeled relating to landscape information. People may be modeled relating zoning information. For example, people representing a family on a walk may be modeled relating to a map property associated with a single-family residential zone. In another example, people representing shoppers may be modeled relating to a map property associated with a commercial retail zone.

There may be one or more methods for modeling an object. For example, information relating to a building shape, such as building information 1002 of FIG. 10A, may be utilized to generate a model of the building, for example building model 1022 of FIG. 10B. In another example, a model may be generated by using zoning information to generate a model. For example, a model may be generated by utilizing zoning information relating to building density to generate a model resembling a building density related to the zoning information.

It may be desirable to utilize an elaborative element in a model when the element may not relate to any map information. For example, if it is desired to have a more elaborate image than what would be provided using map information alone, it may be desirable to use the elaborative element. In such an example, an elaborative element may be a tree, person, animal, sidewalk, bench, and/or the like. In an example embodiment, an elaborative element may be used to illustrate a stylistic transition. For example, a tree may be used to allow an image to indicate a transition in season. In such an example, a tree in one image may indicate winter foliage.

At block 906 at least one image is generated using the model. For example, if a building, street, landscape, and people were modeled, an image relating to a view of the model may be generated. In such an example, the generated image may comprise an image representation of the building, the street, the landscape, and/or the people. A perspective in the model from which to relate an image of the model may be selected. Position information may be utilized to select the perspective. Heading information may be utilized when generating the image. For example, determined heading information may be utilized in determining the perspective of the image relating to the model. For example, if a model is generated representing a one block area, the determined position information may be utilized to determine the perspective of an image generated from the one block model. In such an example, heading information relating to a north heading may be utilized so that the generated image conveys a perspective of the model relating to a viewer facing north.

Figure 10A:
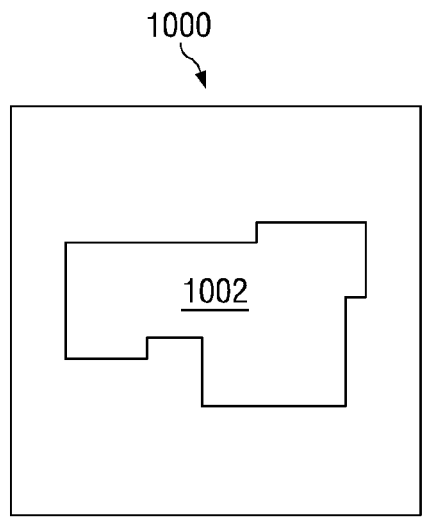
FIG. 10A-10C are yet further additional diagrams showing image generation according to an example embodiment of the present invention.
Figure 10B:
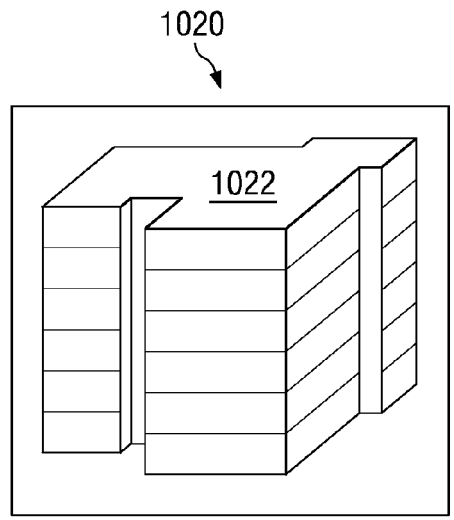
Figure 10C:
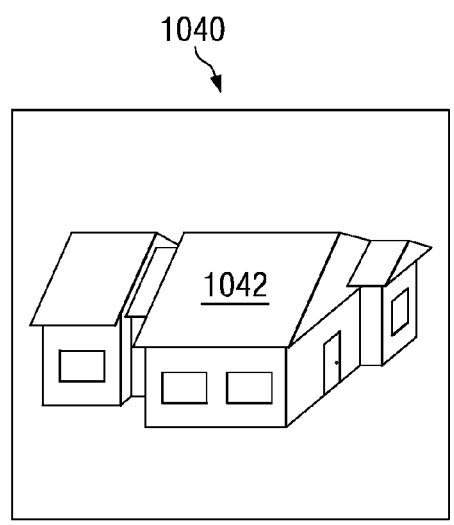

FIGS. 10A-10C are yet further additional diagrams showing image generation according to an example embodiment of the present invention. It should be understood, however, that the image generation of FIGS. 10A-10C as illustrated and hereinafter described are merely illustrative of visual information which may be associated with generating an image, and therefore, should not be taken to limit the scope of the invention.

FIG. 10A is a diagram representing an example of map information 1000. It should be understood, however, that the map information of FIG. 10A as illustrated and hereinafter described is merely illustrative of information which may be associated with a map, and therefore, should not be taken to limit the scope of the invention.

In an example embodiment, building information 1002 may relate to building information of map information 1000. In an example embodiment, building information 1002 may comprise information related to location, shape, height, façade, and/or the like. For example, building information 1002 may comprise information related to a one story single family home having a rectangular base. In another example, building information 1002 may comprise information related to a six story building with a concrete façade having a complex rectangular composite shape.

FIG. 10B is a diagram showing a visual representation 1020 of a model which may be generated. It should be understood, however, that the visual representation of FIG. 10B as illustrated and hereinafter described is merely illustrative of visual information which may be associated with a model, and therefore, should not be taken to limit the scope of the invention.

In an example embodiment, building model 1022 may represent a model of a building generated at least in part using map information, such as building information. In an example embodiment, building model 1022 may represent a six story building. In an example embodiment, it may be desirable to model a building based, at least in part on a base shape, for example the base shape illustrated in building information 1002 of FIG. 10A. In an example embodiment, building information may comprise information related to building height, façade, and/or the like. In such an example, such building information may be utilized to generate a model of the building. In another example embodiment, at least part of building information may be generated. For example, map information such as zoning information, topographic information, aquatic information, flora information, climate information, agricultural information, and/or the like may be utilized, at least in part, to generate a model. In such an example, zoning information associated with high density multi-family housing may be utilized to generate a building model of ten stories.

FIG. 10C is a diagram showing a visual representation 1040 of a model which may be generated. It should be understood, however, that the visual representation of FIG. 10C as illustrated and hereinafter described is merely illustrative of visual information which may be associated with a model, and therefore, should not be taken to limit the scope of the invention.

In an example embodiment, building model 1042 may represent a model of a building generated at least in part using map information, such as building information. In an example embodiment, building model 1042 may represent a single story house. In an example embodiment, it may be desirable to model a building based, at least in part on a base shape, for example the base shape illustrated in building information 1002 of FIG. 10A. In an example embodiment, building information may comprise information related to building height, façade, and/or the like. In such an example, such building information may be utilized to generate a model of the building. In another example embodiment, at least part of building information may be generated. For example, map information such as zoning information, topographic information, aquatic information, flora information, climate information, agricultural information, and/or the like may be utilized, at least in part, to generate a model. In such an example, zoning information associated with low density single family housing may be utilized to generate a building model representing a single story house.

Figure 11:
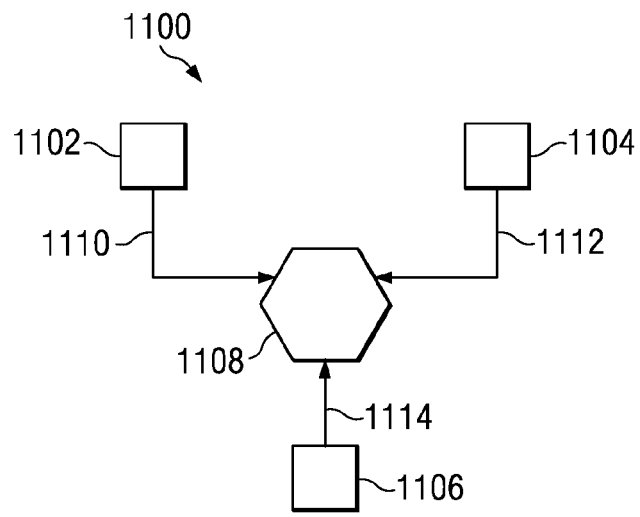
FIG. 11 is a block diagram of an example embodiment of a system which may benefit from the teachings of the invention.

FIG. 11 is a block diagram of a system which may benefit from the teachings of the invention. It should be understood, however, that the system of FIG. 11 as illustrated and hereinafter described is merely illustrative of a system, and therefore, should not be taken to limit the scope of the invention.

System 1100 may comprise a server 1108, and one or more access devices, for example access device 1102, access device 1104, and access device 1106. In an example embodiment, server 1108 and access devices 1102, 1104, and 1106 may be coupled to each other directly or indirectly. In an example embodiment, server 1108 may comprise a computer program which may store, provide, utilize, and/or the like, map information, media object information, position information, and/or the like. For example, server 1108 may comprise a computer program which may comprise an image database, map information, position information related to at least one image, and/or the like. It should be understood that server 1108 may comprise more than one apparatus. For example, server 1108 may comprise a communication apparatus, a database, a computational apparatus, an authentication server, and/or the like. An access device, for example access device 1102, may be used to interact with server 1108. For example, an access device, such as access device 1102, may be an electronic device, for example electronic device 10 of FIG. 12, a computer, and/or the like. In an example embodiment, link 1110 may provide communication between access device 1102 and server 1108. In an example embodiment, link 1112 may provide communication between access device 1104 and server 1108. In an example embodiment, link 1114 may provide communication between access device 1106 and server 1108. A link, for example link 1110, may comprise internet communication, wireless communication, cellular communication, and/or the like.

An access device, for example access device 1102, and/or a server, for example server 1108, may comprise information related to a media object, position information, map information, and/or the like. For example, access device 1102 may comprise position information related to a media object, such as position information. In such an example, access device 1102 may comprise information relating to a media object being presented to a user.

In an example embodiment, information related to map information may be utilized by server 1108. For example, server 1108 may provide access to a media object. In that example, the media object may be related to position information. In such an example, server 1108 may utilize map information and position information related to the media object. For example, server 1108 may generate a visual representation of the map information and the position information related to the media object, for example, position information 204C of FIG. 2.

In an example embodiment, server 1108 may provide access to more than one media object. In an example embodiment, the media objects may be related to position information. In such an example, server 1108 may utilize map information and position information related to the media objects. For example, server 1108 may generate a visual representation of the map information and the position information related to the media objects, for example, position information 204A-204I of FIG. 2.

Figure 12:
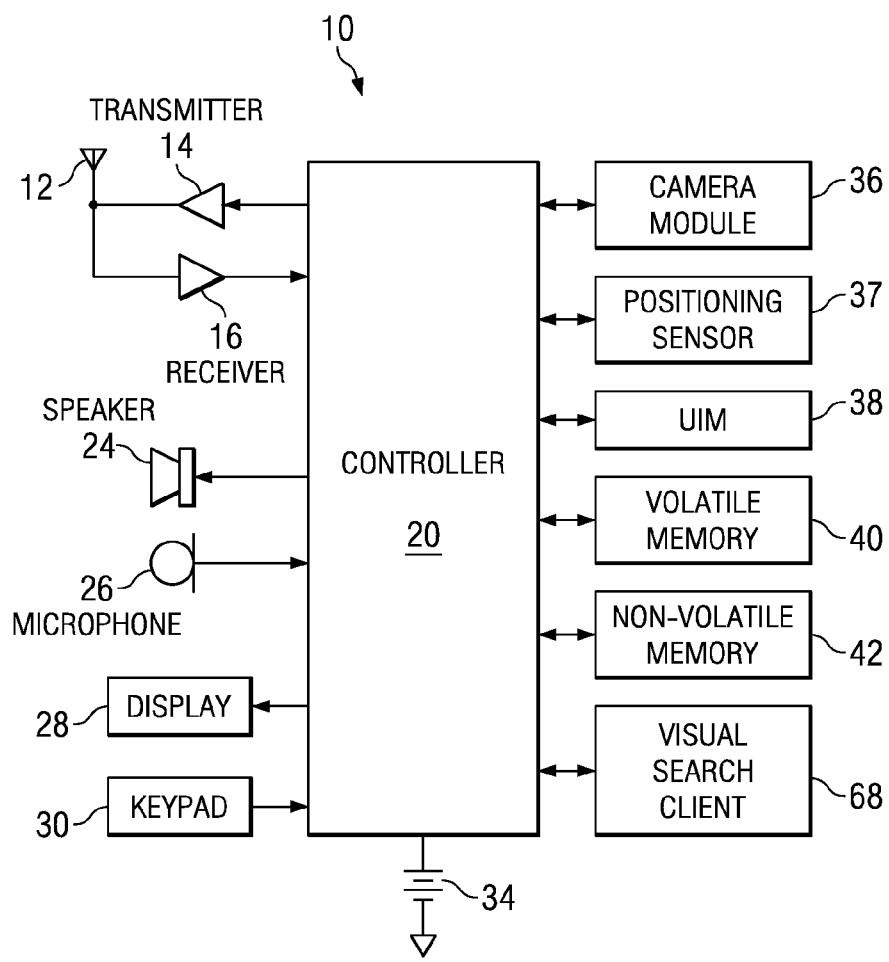
FIG. 12 is a block diagram showing an example embodiment of an electronic device which may benefit from the teachings of the invention.

FIG. 12 is a block diagram showing an electronic device which may benefit from the teachings of the invention. It should be understood, however, that a electronic device as illustrated and hereinafter described is merely illustrative of an electronic device that would benefit from embodiments of the present invention and, therefore, should not be taken to limit the scope of the present invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, cameras, video recorders, GPS devices and other types of electronic systems, may readily employ embodiments of the present invention. Furthermore, devices may readily employ embodiments of the present invention regardless of their intent to provide mobility.

Embodiments of the present invention will be primarily described below in conjunction with mobile communications applications. However, it should be understood that embodiments of the present invention may be utilized in conjunction with a variety of other applications, both in the mobile communications industries and outside of the mobile communications industries.

The electronic device 10 comprises an antenna 12 (or multiple antennae) in operable communication with a transmitter 14 and a receiver 16. The electronic device 10 further comprises a controller 20 or other processing element that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with second-generation (2G) wireless communication protocols IS-136 (TDMA), GSM, and IS-95 (CDMA), or with third-generation (3G) wireless communication protocols, such as UMTS, CDMA2000, WCDMA and TD-SCDMA, with fourth-generation (4G) wireless communication protocols, wireless networking protocols, such as 802.11, short range wireless protocols, such as Bluetooth, and/or the like.

It is understood that the controller 20 comprises circuitry desirable for implementing audio and logic functions of the electronic device 10. For example, the controller 20 may comprise a digital signal processor device, a microprocessor device, various analog to digital converters, digital to analog converters, and other support circuits. Control and signal processing functions of the electronic device 10 are allocated between these devices according to their respective capabilities. The controller 20 thus may also comprise the functionality to convolutionally encode and interleave message and data prior to modulation and transmission. The controller 20 may additionally comprise an internal voice coder, and may comprise an internal data modem. Further, the controller 20 may comprise functionality to operate one or more software programs, which may be stored in memory. For example, the controller 20 may operate a connectivity program, such as a conventional Web browser. The connectivity program may then allow the electronic device 10 to transmit and receive Web content, such as location-based content and/or other web page content, according to a Wireless Application Protocol (WAP), Hypertext Transfer Protocol (HTTP), and/or the like, for example.

The electronic device 10 may also comprise a user interface including an output device such as a ringer, a conventional earphone and/or speaker 24, a microphone 26, a display 28, and/or a user input interface, which are coupled to the controller 20. The user input interface, which allows the electronic device 10 to receive data, may comprise any of a number of devices allowing the electronic device 10 to receive data, such as a keypad 30, a touch display (not shown) or other input device. In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the controller 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 comprises hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the controller 20 in the form of software for creating a digital image file from a captured image. In an example embodiment, the camera module 36 may further comprise a processing element such as a coprocessor which assists the controller 20 in processing image data and an encoder and/or decoder for compressing and/or decompressing image data. The encoder and/or decoder may encode and/or decode according to a standard format, for example, a JPEG standard format.

The electronic device 10 may further comprise a user identity module (UIM) 38. The UIM 38 may be a memory device having a built in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a mobile subscriber. In addition to the UIM 38, the electronic device 10 may be equipped with memory. For example, the electronic device 10 may comprise volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may additionally or alternatively comprise an EEPROM, flash memory or the like, such as that available from the SanDisk Corporation of Sunnyvale, Calif., or Lexar Media Inc. of Fremont, Calif. The memories may store any of a number of pieces of information, and data. The information and data may be used by the electronic device 10 to implement the functions of the electronic device 10. For example, the memories may comprise an identifier, such as an international mobile equipment identification (IMEI) code, which may uniquely identify the electronic device 10.

Although FIG. 12 illustrates an example of a electronic device which may utilize embodiments of the present invention, it should be understood that the electronic device 10 of FIG. 12 is merely an example device that may utilize embodiments of the present invention. For example a device having a processing element for managing memory operations may utilize embodiments of the present invention. For example, such a device may also comprise or otherwise be in communication with a memory device. Such a device may comprise some form of user interface. For example, such devices could be, but are not limited to, portable digital assistants (PDAs), pagers, mobile computers, desktop computers, televisions, gaming devices, laptop computers, cameras, video recorders, GPS devices and other types of electronic systems. A processing element such as those described above may be embodied in various ways. For example, the processing element may be embodied as a processor, a coprocessor, a controller or various other processing means or devices including integrated circuits such as, for example, an ASIC (application specific integrated circuit), FPGA (field programmable gate array), and/or the like.

Without in any way limiting the scope, interpretation, or application of the claims appearing below, it is possible that a technical effect of one or more of the example embodiments disclosed herein may be to automatically generate an image to provide a visual context for a media object. Another possible technical effect of one or more of the example embodiments disclosed herein may be automatically present an image to provide a visual context for a media object. Another technical effect of one or more of the example embodiments disclosed herein may be improve a user experience related to a media object.

Embodiments of the present invention may be implemented in software, hardware, application logic or a combination of software, hardware and application logic. The software, application logic and/or hardware may reside on at least one access device or at least one server. If desired, part of the software, application logic and/or hardware may reside on an access device, part of the software, application logic and/or hardware may reside on a server, and part of the software, application logic and/or hardware may reside on another server. The application logic, software or an instruction set is preferably maintained on any one of various conventional computer-readable media. In the context of this document, a "computer-readable medium" may be any media or means that can contain, store, communicate, propagate or transport the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
   at least one processor; and
   at least one memory including computer program code for one or more programs,
   the at least one memory and the computer program code configured to, with the at least one processor, cause the apparatus to perform at least the following,
   determine a first position information related to a first media object;
   determine a second position information related to a second media object;
   generate at least one image based, at least in part, on the first position information and the second position information; and
   generate an animation comprising the at least one generated image.

2. An apparatus of claim 1, wherein the apparatus is further caused to: display the first media object.

3. An apparatus of claim 1, wherein the apparatus is further caused to: display the second media object.

4. An apparatus of claim 1, wherein the apparatus is further caused to: display the at least one generated image.

5. An apparatus of claim 1, wherein the apparatus is further caused to:
   automatically generate the animation comprising the at least one generated image.

6. The apparatus of claim 5, wherein the animation comprises depiction of at least one of:
   movement along a path between a location related to the first media object and a location related to the second media object; and
   a transition between a heading related to the first media object and a heading related to the second media object.

7. The apparatus of claim 1, wherein the generation comprises at least one of:
   determining a location between the first position information and the second position information; and
   determining a heading between the first position information and the second position information.

8. The apparatus of claim 1, wherein the generating comprises at least one of:
   determining information related to a building,
   generating a representation of a building,
   determining information related to a street, and
   generating a representation of a street.

9. The apparatus of claim 1, wherein the generating comprises at least one of:
   determining a time between a time related to the first media object and a time related to the second media object;
   determining a weather condition related to the first media object and the second media object; and
   determining a stylistic attribute related to the first media object and the second media object.

10. The apparatus of claim 9, wherein the stylistic attribute comprises at least one of:
    lighting;
    image resolution; and
    color.

11. A method, comprising:
    determining a first position information related to a first media object;
    determining a second position information related to a second media object;
    generating at least one image based, at least in part, on the first position information and the second position information; and
    generating an animation comprising the at least one generated image.

12. The method of claim 11, further comprising displaying the first media object.

13. The method of claim 11, further comprising displaying the second media object.

14. The method of claim 11, further comprising displaying the at least one generated image.

15. The method of claim 11, further comprising automatically generating the animation comprising the at least one generated image.

16. The method of claim 15, wherein the animation comprises depiction of at least one of:
    movement along a path between a location related to the first media object and a location related to the second media object; and
    a transition between a heading related to the first media object and a heading related to the second media object.

17. The method of claim 15, wherein the animation comprises depiction of at least one of:
    passage of time between a time related to the first media object and a time related to the second media object; and
    a stylistic transition between a stylistic attribute related to the first media object and a stylistic attribute related to the second media object.

18. The method of claim 11, wherein the generating comprises at least one of:
    determining a location between the first position information and the second position information; and
    determining a heading between the first position information and the second position information.

19. The method of claim 11, wherein the generating comprises at least one of:
    determining a time between a time related to the first media object and a time related to the second media object;
    determining a weather condition related to the first media object and the second media object; and
    determining a stylistic attribute related to the first media object and the second media object.

20. The method of claim 19, wherein the stylistic attribute comprises at least one of:
    lighting;
    image resolution;
    and color.

21. The method of claim 11, wherein the generating comprises at least one of:
    determining information related to a building,
    generating a representation of a building, determining information related to a street, and
generating a representation of a street.

22. A non-transitory computer-readable storage medium carrying one or more sequences of one or more instructions which, when executed by one or more processors, cause an apparatus to at least perform the following steps:
   determining a first position information related to a first media object;
   determining a second position information related to a second media object;
   generating at least one image based, at least in part, on the first position information and the second position information; and
   automatically generate an animation comprising the at least one generated image.

* * * * *